United States Patent
Stone

(10) Patent No.: US 7,698,566 B1
(45) Date of Patent: Apr. 13, 2010

(54) LOCATION-BASED VOICE-PRINT AUTHENTICATION METHOD AND SYSTEM

(75) Inventor: M. Jeffrey Stone, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 1407 days.

(21) Appl. No.: 10/889,942

(22) Filed: Jul. 12, 2004

(51) Int. Cl.
*H04K 1/00* (2006.01)

(52) U.S. Cl. ..................................................... 713/186

(58) Field of Classification Search ................. 713/186, 713/168, 182, 183, 184; 704/273
See application file for complete search history.

(56) References Cited

U.S. PATENT DOCUMENTS

| | | | |
|---|---|---|---|
| 6,085,084 A * | 7/2000 | Christmas | 455/411 |
| 6,591,242 B1 * | 7/2003 | Karp et al. | 705/2 |
| 7,536,304 B2 * | 5/2009 | Di Mambro et al. | 704/273 |
| 2002/0083121 A1 * | 6/2002 | Chang et al. | 709/201 |
| 2002/0116175 A1 * | 8/2002 | Stouffer et al. | 704/9 |
| 2003/0135740 A1 * | 7/2003 | Talmor et al. | 713/186 |

FOREIGN PATENT DOCUMENTS

WO      WO0223367 A1 *  3/2002

OTHER PUBLICATIONS

Wu et al., *Secure Web Authentication with Mobile Phones*, printed from World Wide Web on Apr. 6, 2004 at http://sow.csail.mit.edu/2003/proceedings/Wu.pdf.
Worthman, *A concept that's time has come*, Aug. 1, 2001, http://rfdesign.com/ar/radio_concept-thats-time/.
*Vocent Unveils Voiceprint Authentication Prototype*, Feb. 13, 2003.
MobileVoice ™ æ Secure Mobile Access, p. 1-16, date unknown, http://www.voiceproce.com/MobileVoice%2520-%2520productsheet.pdf.

* cited by examiner

*Primary Examiner*—Jung Kim
*Assistant Examiner*—Samson B Lemma

(57) ABSTRACT

An authentication system is described for controlling a person's access to a resource, which may be a physical resource or a network resource. The authentication system obtains credential information for the person (e.g., using a coded card or keypad for username and password), a voice print from the person, and the current geographical location of the user. The voice print and geographic location are preferably obtained from a telephone call that occurs between the person and the authentication system. The call can take the form of a cell phone call placed by the person to the authentication system. The authentication system includes a user profile database. If the credential information and voice print match those of persons authorized to access the resource, and the user is at a registered permissible location to access the resource, the authentication system sends a signal to the resource indicating that the authentication was successful.

21 Claims, 6 Drawing Sheets

LOCATION-BASED VOICE-PRINT AUTHENTICATION METHOD AND SYSTEM

BACKGROUND

This invention relates to method of authenticating a person seeking to access a resource, which can be either a physical resource (such as a secure room) or a computer network resource, such as the network itself, a file on a network server, or other network resource.

Various industries have long recognized a need to authenticate users who seek to gain access to secure resources such as restricted buildings, rooms, safes, or other structures, or network resources such as computer systems for instance. Various authentication mechanisms have been proposed. In a simple embodiment, an authentication system extracts data from an authentication token (such as an encoded card) and receives a password (such as a personal identification number) from the user. The authentication system validates the information from the token, and the password from the person, in order to confirm that the user is entitled to gain access with the authentication token. In more complex applications, an authentication system receives biometric data (such as a fingerprint, an iris-scan, a face-scan, or a voiceprint) from the person and validates the biometric data in order to confirm that the person is authorized to gain access to the resource.

A method and authentication system is described herein for authenticating users seeking to access either physical or network resources through a combination of credential data (which could be a username plus password and/or the use of a token and/or card), voice print identification, and geographic location. The voice print and geographical location are preferably, but not necessarily, obtained from a telephone call between the user and the authentication system. The unique combination of credential data, and data obtained from a telephone call between the user and the authentication system, provides for a secure method of authenticating users.

Prior art references include US published patent application 2003/0135740 to Talmor et al., and U.S. Pat. No. 6,591,242.

SUMMARY

In a first aspect, a method of authenticating a user seeking access to a resource, is provided. The method uses an authentication system that includes an authentication server. The method includes the step of obtaining credential information from the user and sending it to the authentication server. The credential information can be obtained directly from the user via voice or a keypad entry of username and password, or from a coded card or the like, or by some combination of the above. The method further includes a step of initiating a voice communication between the user and an authentication system and obtaining a voice print of the user. In a situation where the resource is a physical resource, the resource can be proximate to a fixed telephone that is used fro this purpose; alternatively the voice communication could be initiated by the user calling the authentication system using their cell phone or other, proximately located land-line phone.

The method continues with the step of determining the current location of the user based on the voice communication with the user. The purpose of this step is to confirm that the user is in a permissible location to be authenticated for access to the resource. One way the authentication server can do this is to send a query to a wireless carrier (or to a location-determination system that will distribute the query to the appropriate wireless carrier), seeking an indication of the location of the user's cell phone, keyed to the cell phone's directory number. The carrier may then return the requested location, and the authentication system may then confirm that the location is a permissible authentication-location. A potential drawback to this process, however, is that it could raise privacy concerns. An alternative solution is for the authentication system to provide the wireless carrier with an indication of one or more permissible (previously registered) authentication-locations and ask the carrier to indicate whether the user's cell phone is located at one of those locations. Thus, the carrier can simply respond with a Boolean indication of whether the user is in a permissible authentication-location, rather than providing the authentication system with the user's actual location. A similar technique can be used if the user uses a land-based telephone—consult a database that correlates phone numbers with locations and return the location, or a Boolean value indicating whether the phone is located at a registered location.

The method continues with a step of consulting a user profile database in the authentication system and providing an authorization signal to the resource indicating that the user is authorized to access the resource if 1) the credential information from the user matches credential information in the user profile database; 2) the voice print of the user matches a voice print sample of a person authorized to access the resource, and 3) the location of the user matches a list of one or more registered permissible locations for the resource and/or the user.

In another aspect, a method is provided for accessing a network resource from a remotely-located computer. The method includes the steps of entering credential information at the computer and sending the credential information to an authentication system. The method further includes the step of initiating a telephone call (cellular telephone call or land line call) between the user of the remotely-located computer and the authentication system and obtaining a voiceprint of the user during the telephone call. The method also includes obtaining current location information of the user. This step can be obtained from the telephone call, such as from a location server in either the cellular network or a land based location server, based on the phone number that the user called from. This step could also be done by other means, such as by extracting GPS data from the telephone call. The method further includes a step of providing a profile database for a plurality of users including the user. The authentication system generates an authorization signal indicating that the user is authorized to access the network resource if 1) the credential information from the user matches credential information for the user in the profile database; 2) the voice-print of the user matches a voiceprint sample of a person authorized to access said network resource, and 3) the location of the user matches a list of one or more registered permissible locations for the resource and/or the user.

In still another aspect, an authentication system for authenticating a user seeking to access a network resource (e.g., web page, network, network server, network server file, etc.) is provided. The authentication system includes a network interface receiving data from a network. The data contains credential information from the user, a voice print of the user, and telephone call information for the user. The authentication system, can take the form of a general purpose computer, network workstation or other form (e.g., combination of general purpose computer or workstation and special purpose computer system functioning as a interactive voice response system). The system includes at least one central processing unit and a memory storing a user profile database. The system further includes machine-readable memory storing a set of instructions for execution by the at least one central processing unit. The instructions include instructions for transmitting the telephone call information to a call location server to determine the geographic location of the user. The call location server can either provide back the location or else a Boolean response indicating whether or not the caller is in a predefined, permitted location for accessing the resource.

The instructions further include instructions comparing the credential information supplied by the user with credential information obtained from the user profile database. The instructions also compare the voice print of the user with a voice print sample (e.g., with a voice print sample of the person associated with the credential information or with voice print samples or all authorized users). The instructions also send an authorization signal to the network resource indicating that the user is authorized to access the network resource if 1) the credential information from the person matches credential information in a user profile database in the authentication system; 2) the voiceprint of the user matches a voice print sample of a person authorized to access the resource, and 3) the user is at one or more registered permissible locations for the resource and/or the user.

BRIEF DESCRIPTION OF THE DRAWINGS

FIG. 7 is an illustration of a screen display of a user's computer, showing one possible method for adding a new location to list of registered locations where access to a network resource can be authorized from.

DETAILED DESCRIPTION OF PREFERRED EMBODIMENT

Figure 1:
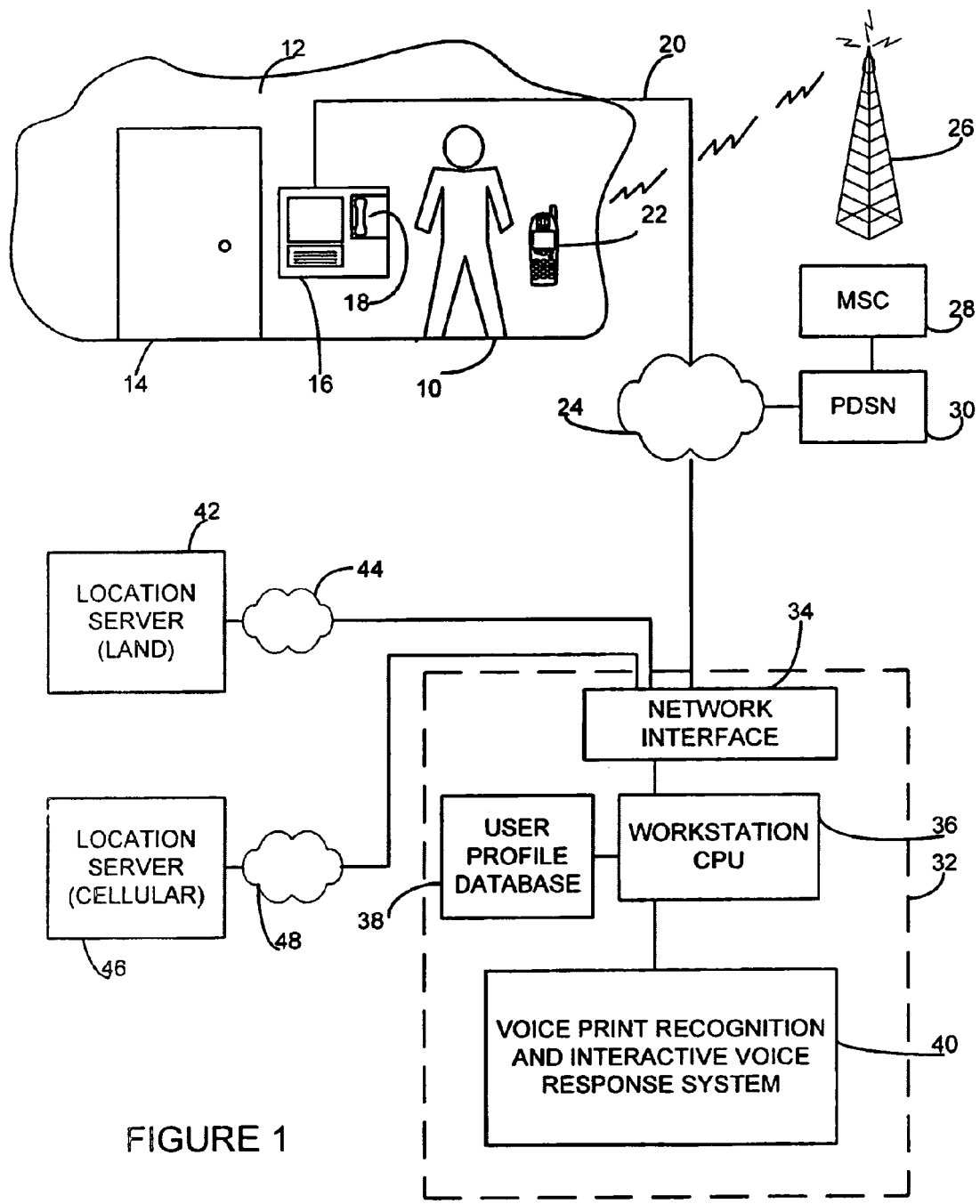
FIG. 1 is a diagram of an authentication system that authenticates a user seeking access to a secure resource in the form of a physical resource, e.g., a locked room.

The preferred embodiments provide for an improved authentication system for authenticating a user that seeks access to a resource. When a user seeks to gain access to a resource, an authentication system will receive and use at least the following three pieces of information cooperatively to authenticate the user: (a) credential data, such as, for example a username and password provided by the user, or information obtained from encoded card or token, or both, (b) a voiceprint from the user, and (c) a location of the user, which can be obtained from a call location server during a phone call in which the voice print (b) is obtained, from a GPS signal transmitted to the authentication system, or in some other fashion.

The methods described herein can apply in a scenario where the user is seeking to gain access to a network resource (e.g., network, computer system, file on a computer), or a physical resource such as secure location through an entry point such as a door. The authentication system can be co-located with the resource or entry point or it can be located elsewhere or even distributed among various locations. In a preferred embodiment, for instance, the authentication system will be located remotely from the entry point (such as being placed on a packet switched network such as an IP local area network or the Internet, or on a telephone company network) and will communicate with the user at the entry point via one or more telecommunications networks (e.g., cellular telephone network and computer network connected to the user or to a terminal connected to the resource).

In one preferred embodiment, the following functions are performed when a user seeks to gain access to a given resource from a given location:

a. Receiving credential data from the user into the authentication system. (The credential data may comprise a username, password, and/or one or more other credential parameters. The user could enter the credential data by keyboard entry, speaking, or in some other manner, or by using an encoded device or card, token or similar device).

b. Operating the authentication system to validate the credential data. (This function can involve using the credentials to look up a user profile for the user, and confirming from the profile and credentials that the user is authorized to access the resource.)

c. Establishing a voice communication between the user and the authentication system, and conveying the user's voice from the user to the authentication system. (The voice communication will typically be via a telephone call placed from the user to the authentication system, or from the authentication system to the user. The user could operate a wireless telephone, such as a cell phone, or a land line telephone, such as a Plain Old Telephone Service (POTS) or handset adjacent to the resource that uses a private, non-switched line connected at the entry point. Further, this function of receiving voice from the user could be combined with receiving credential data from the user, in a scenario where the user speaks the credential data.)

d. Operating the authentication system to validate the user's voice. (This function will apply existing voiceprint recognition technology, to confirm that the user's voice matches a voiceprint profile for an authorized person the user purports to be. Alternatively, the voiceprint could be compared to voice prints of all authorized users to see if a match exists).

e. Determining the current location of the user. (This function can be carried out by determining the location of the telephone that the user is operating in the voice communication function c. described above. Telephone location-determination techniques, for both wireless and landline telephones, are well known and use call location servers, as described below. The location information could also come from GPS data transmitted from the cell phone used by the user to the authentication system or by other means).

f. Operating the authentication system to validate the user's location. (This function can involve determining that the user is located at a permissible entry point, so as to preclude some other remotely located user from providing the authentication system with voice to authenticate the user. The granularity of the location determination and the location validation is a matter of design choice. The authentication system will preferably include a database that stores a list of registered, permitted locations for which user access is allowed, and if the location determination step indicates that the user is not in a registered, previously authorized location, the access is denied.)

Example 1

As a more specific example, consider a scenario where a user is at a computer terminal (such as a personal computer) and seeks to gain access to a network resource in the form of a remote network server, such as a server providing online banking services. The banking website prompts the user to enter a username and password, and the user responsively enters those credentials. The banking web server receives the credentials, and transmits the credentials to an authentication server. The authentication server may then query a user profile store to validate the user's credentials. The authentication server then retrieves the user's phone number, in the present example a cell phone number but the process works in an analogous manner with a land line phone number.

The authentication server then invokes an interactive voice response (IVR) system (considered for present purposes to be part of the authentication system), and causes the IVR system to place a voice telephone call to the user's cell phone. Once the call is established, the IVR system prompts the user to speak a certain phrase or to generally speak (i.e., obtain a voice print). The IVR system receives the user's voice print in response. Applying voiceprint recognition technology, the IVR system then determines if the user's voiceprint matches a voiceprint stored in the user's profile (or matches a voice print of authorized users), so as to confirm that the user is who the user purports to be. The IVR system then signals back to the authentication server with an acknowledgement that the voiceprint matched.

The authentication server proceeds to further validate the user's location, i.e., to confirm that the user is in a permissible location to be authenticated for access to the resource. One way the authentication server can do this is to send a query to a wireless carrier (or to a location-determination system that will distribute the query to the appropriate wireless carrier), seeking an indication of the location of the user's cell phone, keyed to the cell phone's directory number. The carrier then returns the requested location, and the authentication system then checks a database for the resource to see that the location is a permissible authentication-location.

If the administrator of the authentication system wishes to preserve privacy of the user's location, in an alternative embodiment it would verify the user's location by simply forwarding the user's telephone number to the wireless carrier along with an indication of one or more permissible authentication-locations for the resource and ask the wireless carrier to access its location determination server and return a Boolean value indicating whether the user's cell phone is located at one of the registered, permissible locations for authentication of the resource. The carrier responds with a Boolean indication of whether the user is in a permissible authentication-location, rather than providing the authentication system with the user's actual location.

Once the authentication system has validated the user's credential data, the user's voiceprint, and the user's location, the authentication system may then provide a positive authorization signal to the banking system. The banking system may then grant the user access to the online banking system.

Suppose, in this scenario, the user has previously advised the authentication system that the permitted locations are the user's home and office, and provided geographical coordinates for the home and office. The geographical coordinates could be by street address (typically this is the easiest method), by latitude and longitude coordinates, by political subdivision (Jefferson County, Chicago, etc.), by zip code, by telephone area code, or in some other format. Suppose the user had to go on an extended business trip to Minneapolis and wanted to access the network resource during this period. If the user knew that he would be within 20 miles from the center of downtown Minneapolis during the trip, he would expand the list of registered permitted addresses to include the geographical center of downtown Minneapolis (such as by providing the street address of the city center) and the area within a 20 mile radius. Such additions to registered locations could be entered by means of interactive web page provided by the authentication system and appropriate prompts and fields on the web page, by an operator over the phone, by mail or fax instructions, or in some other convenient means. Thus, the list of registered permitted access points can be dynamically changed by the authorized user or by a system administrator.

It should be noted that the order in which the authentication process proceeds credential, voice and location, is not considered important and that the three types of authentication could proceed in any order.

Example 2

As another example, consider a scenario where a user seeks to gain access to a high-security building. Thus, the user may arrive at a door to the building and find a telephone mounted on the wall by the door. To begin the entry process, the user may place a telephone call from the telephone to an authentication system's IVR system, e.g., invoking a speed-dial button on the telephone. The authentication IVR system may then prompt the user to speak or provide DTMF entry of credential data, such as a personal identification number. (The credential data could also be obtained from the user typing at a terminal having a keyboard, or by inserting a coded card in a reader, with the terminal and/or reader located proximate to the door).

Once the user has entered the credential data, the system proceeds to obtain a voice print. If the user speaks the credential data, the authentication IVR system may further perform voiceprint recognition on the spoken credential data to confirm that the user is who the user purports to be, or ask the user to speak a special phrase or phrases.

In the event the user entered the credential data by a non-speaking manner, such as through the use of a card reader, touch tones or terminal keypad, the user proceeds to enter voice communication with the authentication system. In this example, they pick up the phone next to the door and press "2" or some other number or number to access an IVR system that is incorporated in to the authentication system. The IVR system in the authentication system prompts the user to speak a pass phrase to obtain a voice print of the person. The IVR system then performs voiceprint recognition to confirm the person's identity.

The authentication system proceeds to confirm that the user is at a permissible authentication-location. In this instance, the authentication IVR system may perform this function based on the telephone number from which the user called, as indicated by automatic line identification (caller-ID) information provided for the call to the authentication IVR system. The authentication IVR system may then query a location-determination system, which may dip into a line information database (LIDB) to determine where the calling number is located and report the location back to the authentication IVR system, and the authentication IVR system may then determine if the location is a permissible authentication-location. Where the phone next to the resource uses a dedicated, non switched line, location determination could be as simple as confirming that the phone next to the resource is the same phone that was used to transmit the voice print data.

Upon successful validation of the user's credential data, voiceprint, and location, the authentication IVR system may then provide a positive authorization signal to the resource. In this case, the positive authorization signal could cause a door lock to be disengaged at the resource, so as to allow the user to enter the high-security building.

Various other examples, including variations on the foregoing examples, are possible as well.

Referring now to the drawings, representative, non-limiting examples of preferred embodiments will be described with more particularity. FIG. 1 is a diagram of an authentication system that authenticates a user 10 seeking access to a secure resource 12 in the form of a physical resource, e.g., a locked room behind a door 14. The authentication system includes a terminal 16 for receiving credential data and a remotely-located computer system 32 linked to the terminal 16 via a communications network 24. The terminal 16 also includes a telephone 18 in the illustrated embodiment. The terminal is coupled to the network 24 via a telephone line or local area network, or some other medium so as to allow credential information, voice print samples, and location information to be conveyed to the computer system 32. The details of the communications network 24 and communications medium 20 are not particularly important. In one possible embodiment, the terminal 16 does not include a telephone 18 and instead the user 10 makes voice contact with the authentication system computer system 32 via a cellular telephone 22. The cellular telephone communicates with a cellular telephony base station 26, which is coupled to other cell network infrastructure, including a mobile switching center 28 and a packet data serving node 30 that is coupled, directly or indirectly, to the network 24. The network 24 could be an IP wide are network such as the Internet, or a corporate backbone or LAN network, SS7 network, or other type of network the details of which are not critical.

The authentication system computer system 32 includes a network interface 34 that receives authentication, voice print and geographical location data from the user 10 over the network 24. The computer system 32, which could take the form of a network workstation, general purpose computer, or special purpose computing platform, includes a central processing unit 36 that is coupled with a memory storing a user profile database 38. The user profile database 38 includes credential data for users authorized to access the resource 12, voice print samples from the authorized users, and geographical location data which consists of predetermined, registered locations in which the authorized user(s) must be located in order to access the resource.

The computer system 32 also includes a voice print recognition module and interactive voice response subsystem 40. This subsystem 40 generates speech signals that are sent to the user's telephone 22 (or to telephone 18) and prompt the user to enter a speech pattern for voice recognition purposes. The subsystem also extracts credential data supplied in voice form from the user (if this is the medium in which the credential data is sent to the computer system 32). This subsystem 40 also extracts the voice print sample from the user's speech, checks the voice print sample for the authorized user (s) in the database 38 and determines whether a match exists.

Interactive voice response systems are known in the art and described in the patent literature, see e.g., U.S. Pat. Nos. 6,411,686; 6,154,527 and 5,825,856, which are all incorporated by reference. Voice print recognition technology is also known in the art and described in the patent literature. See, e.g., U.S. Pat. Nos. 6,751,590 and 6,510,415 and prior art cited therein, both of which are incorporated by reference herein. Accordingly, further details on the specifics of the subsystem 40 are omitted for the sake of brevity. The manner in which this subsystem is implemented is not especially important or critical.

Location information from the user 10 could be determined in a variety of methods. In one method, the phone number (or specific phone) the user is calling from is extracted from the data received from the network 24. If the caller is using a land-line telephone, the phone number is sent from the computer system 32 to a telephone company location server 42 via a network 44 and the location server returns a geographical location for the phone corresponding to the telephone 18. If the phone 18 is a private phone that is part of the authentication system and is linked to the system 32 by a private dedicated line (and thus not on a general purpose switched telephone line), the location could be determined simply by including in the phone signal a code identifying the telephone and looking up in a database the location of the phone. If the user establishes voice communication with the system 40 via a cellular telephone, the cell number is sent to a cellular telephone company location server 46 via a network 48. The cellular telephone company location server may use techniques such as disclosed in Karp et al., U.S. Pat. No. 6,591, 242 to determine location, or GPS data from the phone 22 to determine the location of the cell phone 22. U.S. Pat. No. 6,591,242 is incorporated by reference herein. An alternative method is explained in detail below.

In one possible embodiment, the location information is obtained directly from the location server 42 or 46. The workstation CPU 36 then compares the location with the registered permissible locations for the resource in the user profile database 38. If the user is at a permitted location, the credential data matches, and the voice print matches, the user is authorized to access the resource. The authentication system computer system 32 sends an authorized signal to the resource (e.g., to the terminal 16). The terminal 16 responsively unlocks the door 14 and the user is permitted access. Alternatively, if there is a guard at the resource, the "authorized" signal is displayed on the terminal 16 (or on the guard's terminal) and the guard permits the user 10 to access the resource 12.

In an alternative embodiment, a location query is sent to the location server 42 or 46. The location query includes the phone number of the phone used by the user 10 and the list of all registered, permitted locations. The location server 42 or 46 then determines the location of the user, and checks to see if it is in a permitted location. The location server then sends a Boolean response (e.g., YES or NO) to the computer system 32 indicating whether the user is at a registered location. This embodiment may be used where the telephone company operating the servers 42 and 46 seeks to keep user location information private, while still providing the required confirmation of whether the user is in a permitted geographic area.

A method of authenticating a user 10 seeking access to a resource 12 using the system of FIG. 1 includes a step of obtaining credential information from the user. This can be obtained from use of the terminal 16 (e.g., typing in user name and password) and sending the input from the user to the computer system 32. Alternatively, the terminal 16 could use a code reader or other device to read a card or token carrying user credential data. Alternatively, the user could provide credential data over the phone 18.

Assuming the credential data is valid, the process proceeds to a step of initiating voice communication between the user 12 and the authentication system computer system 32 and obtaining a voice print of the user. The dedicated phone 18 could be used for this purpose or the user could be prompted to call the computer system 32 using their cell phone 22. When voice communication is established, processing control is turned over to the voice response system 40 wherein prompts are given to the user, the user provides speech in response to the prompts, and the speech data is sent to the voice response system 40.

The method further includes a step of determining the current location of the user. This is done in the manner described herein.

The method further uses a step of consulting a user profile database 38 in the authentication system computer system 32 and providing an authorization signal indicating that the user 10 is authorized to access the resource if 1) the credential information from the user matches credential information in the user profile database; 2) the voice print of the user matches a voice print sample of a person authorized to access the resource, and 3) the location of the user matches a list of one or more registered permissible locations for the resource and/or the user. For example, the authorization signal is sent to the terminal 16 and the door is unlocked or a guard notified.

Figure 2:
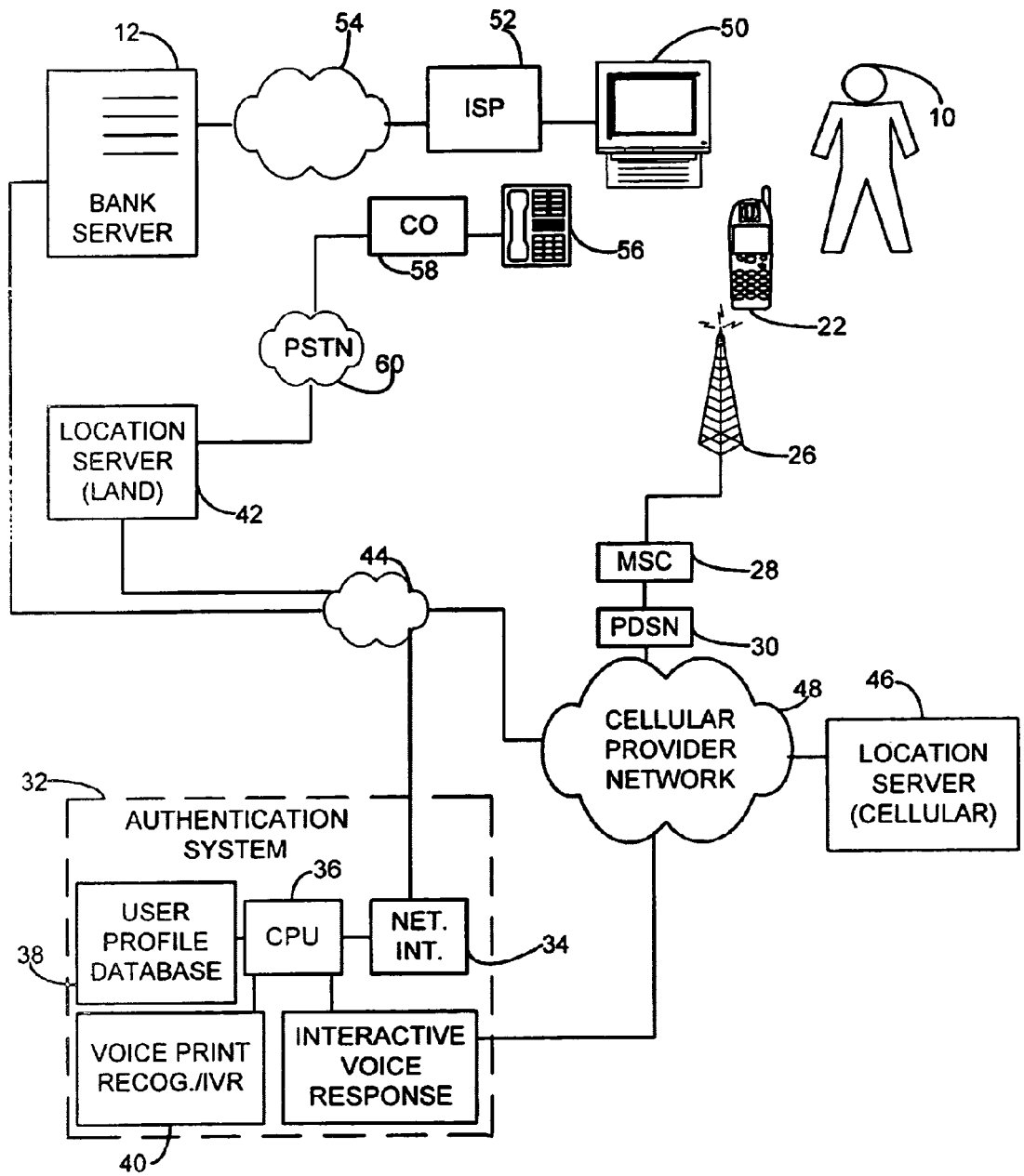
FIG. 2 is a diagram of an authentication system that authenticates a user seeking access to a resource in the form of a network resource, in this example a file on a bank server.

FIG. 2 is a diagram of an authentication system that authenticates a user seeking access to a resource in the form of a network resource, in this example a file on a bank server. The user 10 has a personal computer 50 that connects via an Internet Service Provider 52 to the internet 54 and a resource 12, which in this example is a bank server. The user has at home a land line telephone 56, which is connected via a TELCO central office 58 to a public switched telephone network (PSTN) 60. The user 10 also has a cell phone 22 which communicates with a base station 26 over an air interface, mobile switching center 28, Packet Data Serving Node (PDSN) and cellular service provider network 48. If the user 10 engages in voice communication with the authentication system computer system 32 via the land line telephone 56, the geographic location of the user could be obtained by means of a location server 42. If the user uses his or her cell phone 22 to establish communication with the computer system 32, then the location information could be obtained from the cellular service provider location server 48 as described previously.

A method of using the system of FIG. 2 to provide the user 10 with access to the network resource includes a first step of the user a) entering credential information at the computer 50 and sending said credential information to the authentication system 32. While in FIG. 2, the authentication system is shown separate from the bank server, the authentication system could be co-located with the bank server or implemented in a computer on the bank backbone network; the geographical location of the authentication system is not important. Thus, as one example, in FIG. 2 the user could log on to the bank server web site and be prompted to enter an user name and password. This information is then forwarded to the authentication system computer system 32. The authentication system includes a user profile database 38 with data for authorized users, including credential data (e.g., names and passwords), voice prints, and registered permitted locations.

A second step involves initiating a telephone call between the user 10 and the authentication system computer system 32. For example, once the user has entered the credential data, the CPU 36 causes the voice response system 40 to initiate a telephone call to the user's home phone or cell phone, using a phone number obtained from the user profile database.

Next, after voice communication between the voice response system 40 and the user 10 is established, a voiceprint of the user 10 is obtained during the telephone call.

Next, current location information of the user is obtained from the telephone call, e.g., by sending a location query to the location server 48 and receiving a response, or by means of GPS positional information from the cell phone 22.

The authentication system computer system 32 then consults the user profile database 38 to see if 1) the credential information from the user matches credential information for the user in the profile database; 2) the voiceprint of the user matches a voiceprint sample of a person authorized to access the network resource, and 3) the location of the user determined as indicated above matches a list of one or more registered permissible locations for the resource and/or the user. If so, then the computer system 32 sends an "authorized" signal to the bank server 12 and the user is permitted to access the network resource (e.g., a file storing account data).

Figure 3:
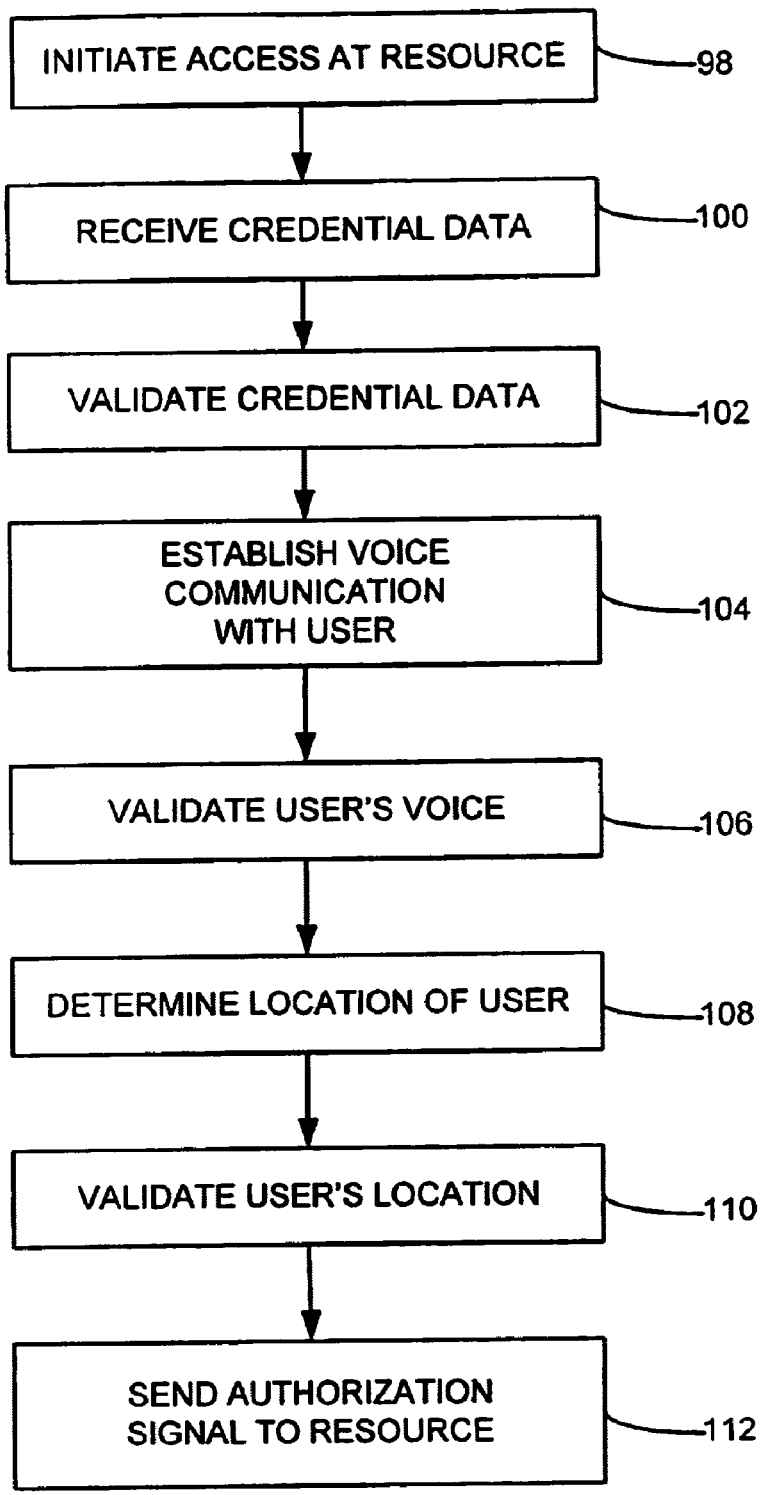
FIG. 3 is a flow chart showing a sequence of authentication steps that may be performed in a preferred embodiment.

The order in which credential data, voice print data and location data is obtained or verified is not particularly important and any order can be used. Thus, while the preceding discussion has used the term "next" to indicate an order of events, this is purely for purposes of illustration of one possible embodiment and not limitation, and the order of steps is not important. FIG. 3 is a flow chart showing a sequence of authentication steps that may be performed in a preferred embodiment. The user initiates access at the resource at step 98 (such as going to the network resource and initiating a log-on process, or activating a terminal at a physical resource indicating their intent to gain access). At step 100 the authentication system receives credential data from the user. At step 102 the credential data is validated. At step 104, voice communication is established between the user and the authentication system and a voice print sample is obtained. At step 106, the voice sample is validated. At step 108, the user's location is determined. At step 110 the location is checked against the list of predetermined authorized locations to validate that the user is at an authorized location. At step 112 the authentication system sends an authorization signal indicating that the user is authorized (or not). As noted, steps 100-110 could be performed in a different order. Moreover, if any one of steps 102, 106 or 110 are not passed, a signal could be sent to the resource indicating an authentication failure. Additionally, the authentication could be performed in discrete steps, one after the other, as shown in FIG. 3, or steps 100, 104 and 108 could be performed one after the other and then an authentication process performed on the voice print, credential data and location data in any order.

Figure 4:
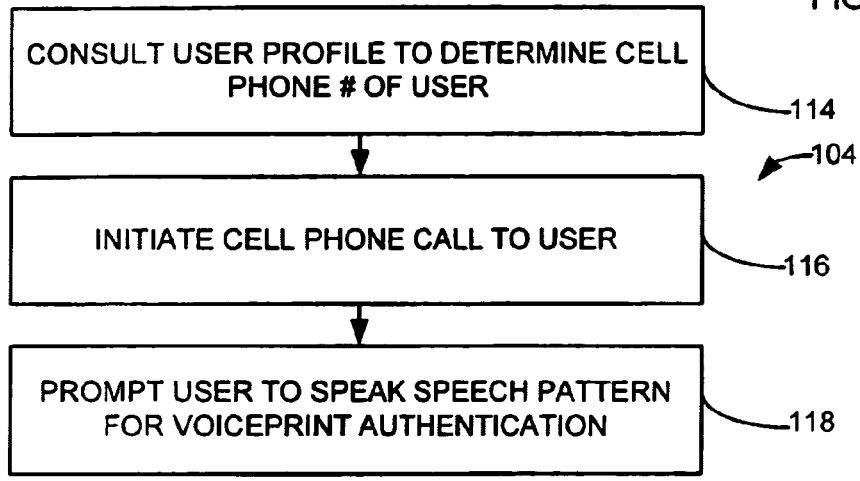
FIG. 4 is a more detailed flow chart for step 104 in FIG. 3, in the situation where a cell phone call is used to establish voice communication between the authentication system and the user.

FIG. 4 is a more detailed flow chart for step 104 in FIG. 3, in the situation where a cell phone call is used to establish voice communication between the authentication system and the user. This example assumes that the user has already entered credential data identifying themselves and the credential data has been validated. The user profile database includes user information, including their cell phone number. At step 114, the user profile database is consulted to determine the cell phone number of the user. At step 116, the voice response system of the authentication system initiates a cell phone call to the user over a wireless communication network. At step 118, the user is prompted to speak a speech pattern which is to be used for voice print authentication purposes. The user responsively provides the speech pattern and it is sent to and stored in the interactive voice response system.

Figure 5:
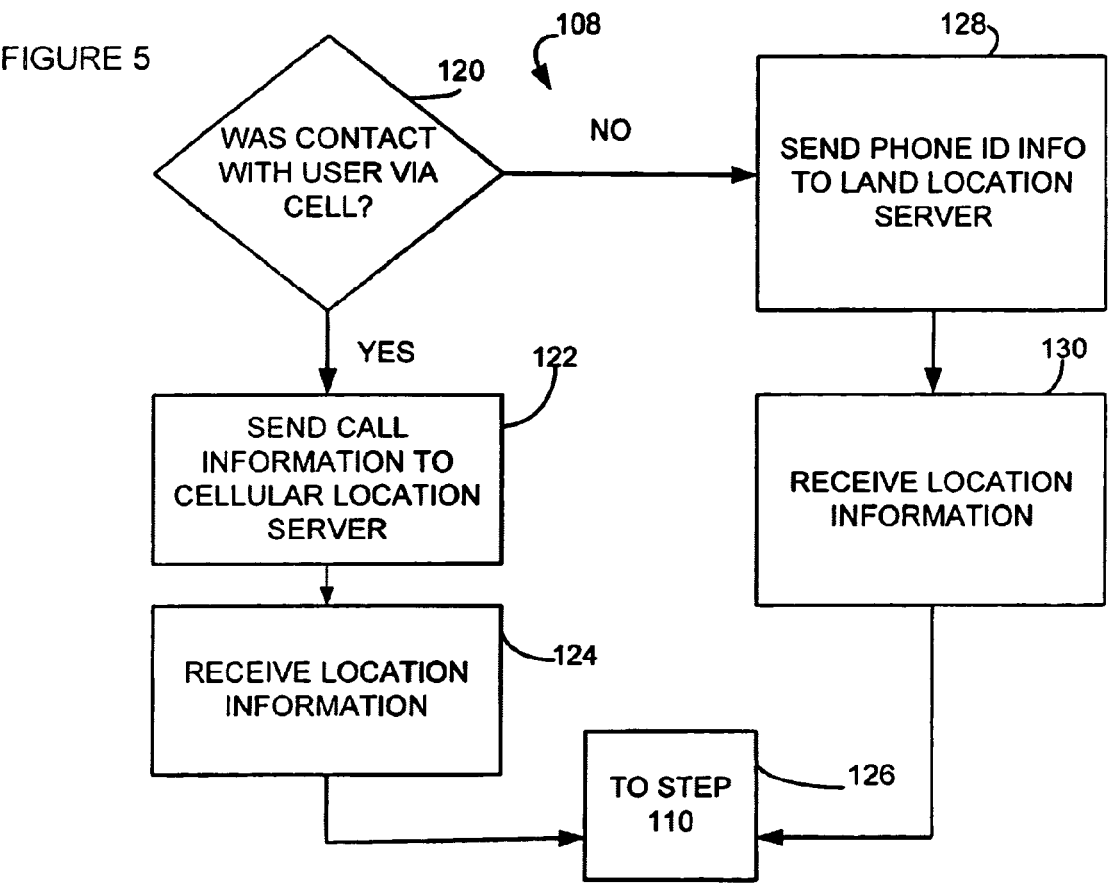
FIG. 5 is a more detailed flow chart for step 108 in FIG. 3, showing two alternative methods for determining the location of the user depending on the type of phone they are using.

FIG. 5 is a more detailed flow chart for step 108 in FIG. 3, showing two alternative methods for determining the location of the user depending on the type of phone they are using. At step 120, a determination is made of whether the voice communication with the user occurs via cellular telephony or by a land-line phone. If cellular communication is used, at step 122 call information is sent to a cellular location server. The call information could be as simple as the telephone number of the user's cell phone. At step 124, the location server determines the location of the cell phone in the manner described herein and returns a geographic location to the authentication system and processing proceeds to step 110 in FIG. 3. If, at step 120, the voice communication occurs via a land line phone, at step 128, the phone identification information (e.g., phone number) is sent to a land line location server. The land line location server determines from a table or database the location of a particular phone number. At step 130, the land line location server returns a geographic location for the user's telephone. Processing proceeds to step 110.

Figure 6:
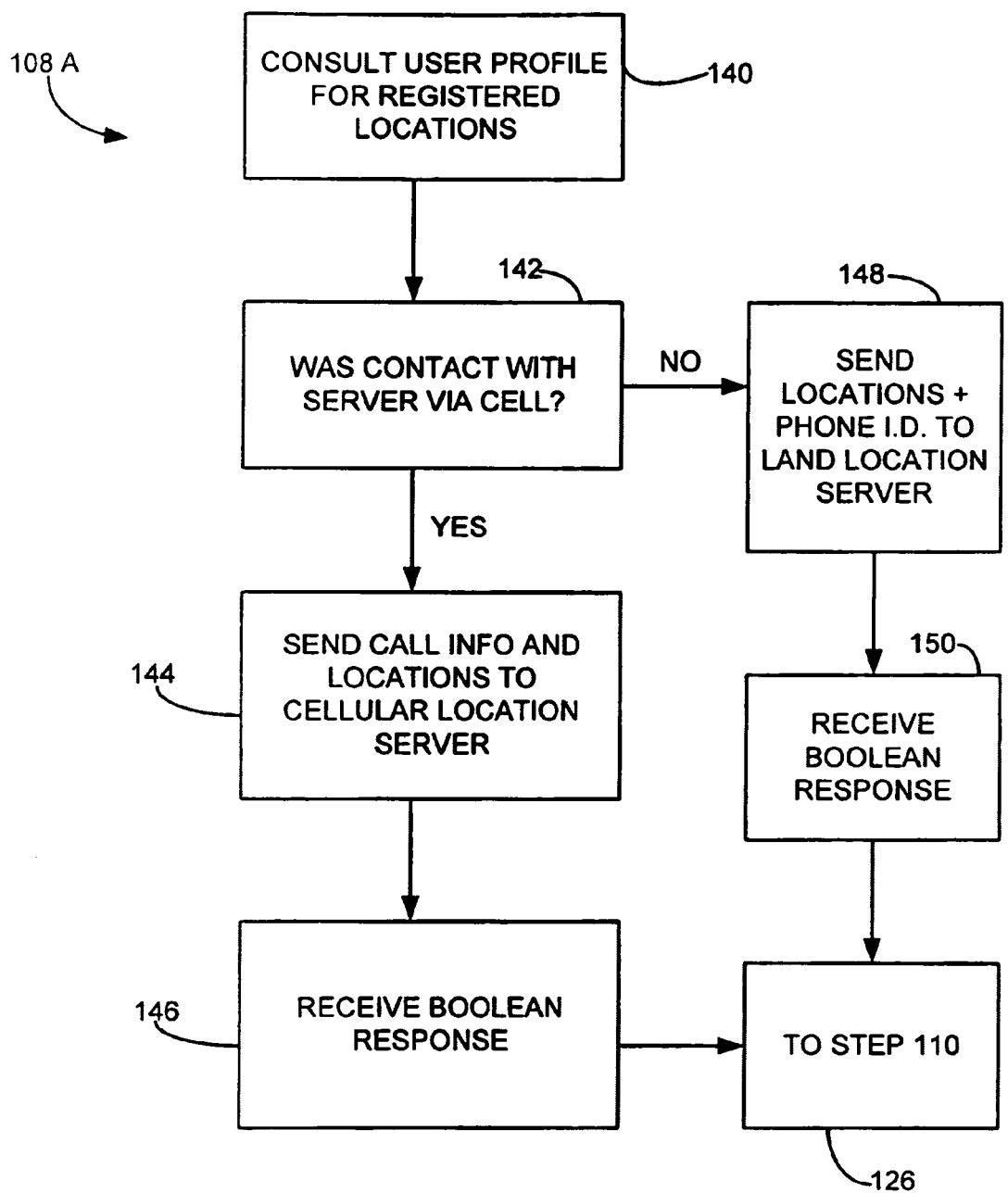
FIG. 6 is an alternative embodiment for step 108 in FIG. 3.

FIG. 6 is an alternative embodiment for step 108 in FIG. 3, and is shown as flow chart 108A. At step 140, the user profile database is consulted to determine the list of registered, permissible locations for access to the resource. At step 142, a determination is made of whether the voice communication with the user was by cell phone or land line phone. If, at step 142, the user was contacted by cell phone, the call information (e.g., phone number) and the registered locations for access are sent to the cellular location server. At step 146, a Boolean response is received, indicating whether the cell phone is in a permitted registered location. Processing proceeds to step 110. Similarly, if at step 142, a landline phone is used, the processing proceeds to step 148 and the phone number and list of registered locations is sent to a land line location server. At step 150, a Boolean response is received indicating whether or not the phone is at a permitted, registered location for access.

Figure 7:
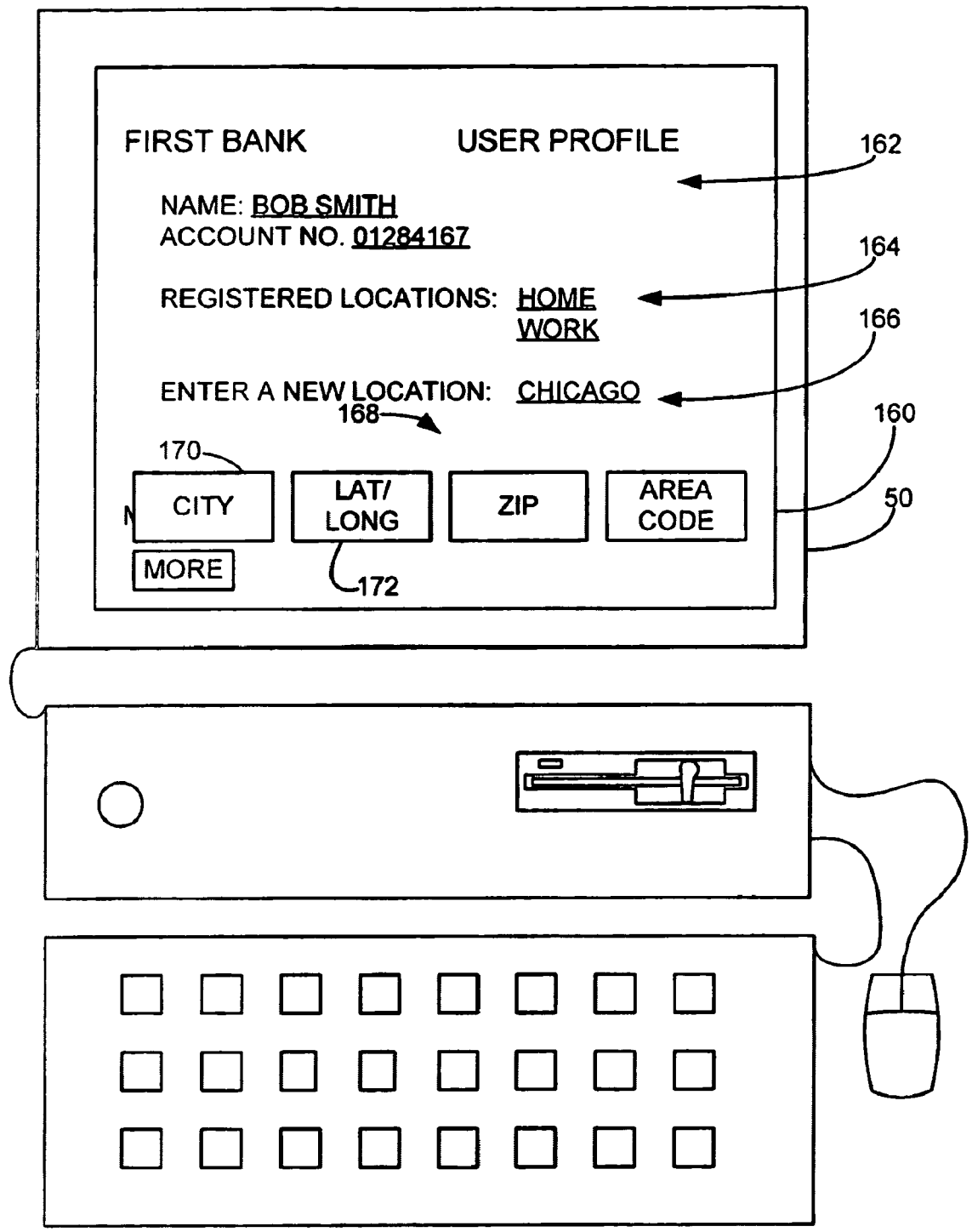

As noted earlier, an authorized user may wish to add new locations to the list of authorized, registered locations in which to access a resource. Such additions may be due to travel, moving, or change in place of employment, or other reason. FIG. 7 is an illustration of a screen display of a user's computer, showing one possible method for adding a new location to list of registered locations in the user profile database. In this example, the network resource is a file on a bank server containing sensitive personal account information and the user profile database is accessed over the Internet via a bank website. In this example, the administrator of the authentication system is the bank and the user profile database is stored on a bank server.

The user has navigated to a page that displays the list of registered permitted locations at which the user may access their bank file. The display 160 includes a field 162 that includes the name and account number of the user, and a field 164 showing the two registered locations that have already been entered into the user profile database: "home" and "work". These are the shorthand names chosen by the user, and the "home" and "work" locations are assigned geographical locations, either in the form of lat./long. coordinates, street addresses, or some other format. Suppose the user is going to be traveling to Chicago and wishes to access the network resource from Chicago. The user enters the name "Chicago" in field 166 and then is instructed to activate one of the icons 168 to indicate a geographical location for the new name "Chicago". For example, the user could activate the button 170 "City" and the entire geographical extent of the city of Chicago is represented by the name Chicago. If the user wants to be more precise, and knows that they will be residing and working (and thus using the resource) from the Downtown area of the city, the user could click on the lat/long. button 172. A screen pops up and the user enters the latitude and longitude of the center of downtown Chicago and a radius of 2 miles from the center of downtown, which covers the intended area. The new area is then added to the user profile database.

Since many users may not know the latitude or longitude of a particular location, but will know a street address, many users will simply enter in a street address of a location where they want access to be approved and a radius surrounding that location (e.g., ¼ mile). There are mapping programs and databases available today that translate street addresses to latitude and longitude coordinates (such as Map-Info). The authentication system administrator will typically take the street address input by the user and convert it to lat./long. coordinates, and store the coordinates in the user profile database. This is because when the user location is determined during the voice communication from a cellular location server, the location is typically determined in terms of latitude and longitude. It is a simple geometric problem to determine whether a location of given latitude and longitude is within a specified radius of another geographic location also expressed in latitude and longitude.

The example of FIG. 7 is just one possible example of how a user could interactively update their user profile in the user profile database. Other methods could be by means of an operator (e.g., calling into an operator of the authentication system and giving the new location over the phone), by emailing the operator of the system, by sending a fax or letter, or by any other convenient means.

Alternative Method for Location Determination of Cellular Phone

While various techniques for determination of the geographic location of a cellular telephone are known, an alternative method will now be described. More particularly, in a common arrangement, a wireless carrier will operate a "mobile positioning center" (MPC) that is arranged to determine and report mobile station locations to requesting entities. The MPC may include or have access to a position determining entity (PDE), which may operate to determine the location of a given mobile station based on (i) the centroid of the cell/sector in which the mobile station is currently operating and (ii) satellite-based positioning information provided by the mobile station. Further, the carrier may operate a location server that acts as a front end for receiving location requests from location-based service (LBS) applications (such as the authentication system and method of this invention) and forwarding those requests to the mobile positioning center.

When the location server receives a location request from an LBS application, the location server may send a corresponding location request to the MPC, and the MPC/PDE may, in turn, determine the location of the mobile station. The MPC may then return the determined location of the mobile station to the location server, and the location server may then return to the LBS application the determined location or data derived from the determined location (such as mapping, routing, or street address information, for instance).

A location request to the MPC may seek either a general or specific indication of the mobile station's location. A general indication of the mobile station's location may be an indication of the location of the cell/sector in which the mobile station is currently operating, such as the geographic location of a centroid of the cell/sector for instance. A specific indication of the mobile station's location, on the other hand, could be a more precise indication of the geographic position of the mobile station itself.

To learn the cell/sector that is currently serving a mobile station, the MPC may send a "low accuracy" location request to the Radio Access Network (RAN) that is currently serving the mobile station, and the RAN may respond with an indication of the cell/sector in which the mobile station is currently operating. To learn a more specific geographic position of the mobile station, on the other hand, the MPC may send a "high-accuracy" location request to PDE, and the PDE may then send one or more high accuracy location requests to the serving RAN and receive high accuracy positioning data—such as positioning information that the mobile station receives from one or more satellites—in response from the RAN. The PDE may then use that high accuracy positioning data, typically in combination with the cell/sector centroid determined by the MPC, to identify the mobile station's geographic position.

In a typical arrangement, the location requests from the MPC/PDE to the RAN will go from the MPC/PDE over a signaling network (e.g., a Signaling System #7 (SS7) network) to the Mobile Switching Center (MSC) of the RAN. In order to send any such requests, the MPC may query a home location register (HLR), also via the signaling network, to determine the point code subsystem number (PC_SSN) of the MSC currently serving the mobile station. For instance, the MPC may send an IS-41 Location Request (LOCREQ) to the HLR, or an IS-637 SMS Request (SMSREQ) message to the HLR, providing the HLR with an identifier of the mobile station, and the HLR would respond (in a Location Request return result (locreq_rr) or SMS Request return result (smsreq_rr)) with the PC_SSN of the currently serving MSC (or a last known serving MSC). The query to the HLR could carry a mobile station identifier (such as a mobile directory number (MDN) as indicated in the initial location request to the MPC.

Industry standard 3GPP2 X.P0002/TIA PN-4747 (IS-881), in turn, defines many of the location request messages that pass between the MPC, PDE and MSC. For instance, a low-accuracy location request from the MPC to the MSC may take the form of an IS-881 "ISPOSREQ" message, and a response to that message may take the form of an IS-881 isposreq return result (isposreq_rr) message. A high-accuracy location request from the MPC to the PDE may take the form of an IS-881 "GSPOSREQ" message, and a response to that message may take the form of an IS-881 gsposreq_rr message. And a high-accuracy location request from the PDE to the MSC may take the form of an IS-881 "SMDPP" message, and a response to that message may take the form of an IS-881 smdpp_rr message.

Further, industry standard IS-801 defines position determination messages that can pass over an air interface between an MSC and a mobile station for purposes requesting and receiving high-accuracy location data. For instance, the MSC can send an IS-801 position determination request (PD Request) message over the air to a mobile station, request the mobile station to provide satellite-based positioning information, and the mobile station can respond with an IS-801 position determination response (PD Response) message over the air to the MSC, providing the requested satellite-based positioning information.

In operation, when the MPC receives a request for a general indication of a mobile station's location, the MPC would first identify the MSC serving the mobile station and would then send an ISPOSREQ message to the MSC, seeking an indication of the cell/sector in which the mobile station is currently operating. If the MSC has the requested cell/sector information, the MSC may then provide an indication of the cell/sector in an isposreq_rr message to the MPC. Otherwise, the MSC may page the mobile station over the air interface so as to receive in a page response from the mobile station an indication of the cell/sector, and the MSC may then send an indication of the cell/sector in an isposreq_rr to the MPC. Once the MPC learns the cell/sector in which the mobile station is currently operating, the MPC may determine (e.g., look up) the geographic centroid of the cell/sector. And the MPC may then report that centroid in a response to the location request.

On the other hand, when the MPC receives a request for a specific indication of a mobile station's location, the MPC may invoke the PDE to determine the location. More particularly, the MPC may first identify the MSC serving the mobile station and may send an ISPOSREQ to the MSC to determine the cell/sector in which the mobile station is currently operating, and the MPC may determine the centroid of that cell/sector. The MPC may then send a GSPOSREQ to the PDE, providing the PDE with (i) an identifier of the mobile station, (ii) an identifier of the serving MSC, and (iii) the determined cell/sector centroid.

Upon receipt of the GSPOSREQ, the PDE may then use the cell/sector centroid to identify (e.g., look up) what satellite(s) the mobile station can use to obtain satellite-based positioning information. The PDE may then send an SMDPP message to the MSC, specifying one or more satellites that the mobile station should use to obtain satellite-based positioning information. In response to the SMDPP message, the MSC may then send an IS-801 PD Request message over the air to the mobile station, indicating the satellite(s) from which the mobile station should get positioning information.

(Normally, the MSC will send the IS-801 PD Request over an air interface traffic channel to the mobile station. Thus, if the mobile station is currently engaged in a communication session and thus already has an assigned traffic channel, the MSC may send the PD request over that traffic channel. On the other hand, if the mobile station is idle or dormant and therefore does not have a traffic channel, the MSC may direct the serving BSC to assign a traffic channel to the mobile station, and the MSC may send the PD request over that traffic channel. In a preferred embodiment, the ISPOSREQ that the MPC sends to the MSC in a high-accuracy location determination scenario would include a code that puts the MSC on notice that the MSC will soon receive a high-accuracy location request, so that the MSC can assign the traffic channel in advance if desired.)

In turn, the mobile station would look to the designated satellite(s) to obtain the requested satellite-based positioning information and would provide the information in an IS-801 PD Response message over the air to the MSC. Upon receipt of that PD Response message, the MSC would then generate and send an smdpp_rr to the PDE, providing the PDE with the requested satellite-based positioning information.

In some cases, the PDE may need additional satellite-based positioning information in order to sufficiently determine the location of the mobile station. Thus, in some cases, the PDE may send one or more additional SMDPP-based location requests to the MSC, which would cause the MSC to send one or more corresponding IS-801 PD Requests to the mobile station, and so forth. Once the PDE has all the information it needs, it may then send an SMDPP "Release" message to the MSC, which would signal to the MSC that the MSC can release the assigned traffic channel (if the traffic channel had been assigned for purposes of the location determination process) or that the MSC can stop using the traffic channel for location determination messaging (if the mobile station was already using the traffic channel).

Provided with the satellite-based positioning information from the mobile station and with the cell/sector centroid from the MPC, the PDE may then apply standard algorithms to determine a relatively precise geographic location of the mobile station, and the PDE may return that location in a gsposreq_rr to the MPC. The MPC may then report that location in a response to the location request that it received.

While presently preferred and alternative embodiments have been described, variation from the illustrated embodiments is possible without departure from the scope of the invention. The scope is to be determined by reference to the appended claims.

The invention claimed is:

1. A method of authenticating a user seeking access to a computer network resource, comprising the steps of:
   a) obtaining credential information from the user;
   b) initiating voice communication between the user and an authentication system for the network resource and obtaining a voice print of the user;
   c) determining the current geographic location of the user;
   d) receiving a list of one or more registered permissible geographic locations at which the user may be present to access the network resource;
   e) determining if 1) the credential information from the user matches credential information in a user profile database; 2) the voice print of the user matches a voice print sample of a person authorized to access said network resource, and 3) the geographic location of the user determined in step c) matches a geographic location in the list of one or more registered permissible geographic locations for the user; and
   f) if 1) the credential information and 2) the voice print match information in the user profile database and 3) the geographic location of the user matches a location in the list of one or more registered permissible geographic locations for the user, then sending an authorization signal to the computer network resource indicating that the user is authorized to access the computer network resource.

2. The method of step 1, wherein step b) comprises the step of initiating a cellular telephone call to the user and where the location of the user is obtained, either directly or indirectly, from said cellular telephone call.

3. The method of claim 2, wherein step c) comprises the step of forwarding identification information for said cellular telephone call to a cellular telephone location server.

4. The method of claim 2, wherein in step e), the determination of whether the geographic location of the user matches a list of one or more registered permissible geographic locations for the user is performed by sending call identification information and a list of registered geographic locations for said resource and/or said user to a cellular location server and receiving a Boolean response indicating whether a match exists between the geographic location of the user and the one or more registered permissible geographic locations.

5. The method of claim 1, wherein step b) comprises initiating a land-based telephone call between the user and said authentication system and wherein in step e), the determination of whether the geographic location of the user matches a list of one or more registered permissible geographic locations for the resource and/or the user is performed by sending call identification information for said land-based call and a list of registered geographic locations for said user to a location server and receiving a Boolean response indicating whether a match exists between the geographic location of the user and the one or more registered permissible geographic locations.

6. The method of claim 1, wherein the credential information is supplied to said authentication system by voice, and wherein the authentication system includes an interactive voice response system for obtaining the voice print from the user.

7. The method of claim 1, wherein said network resource comprises a file on a network server.

8. The method of claim 1, wherein said network resource comprises a web page.

9. The method of claim 1, wherein said user profile database is accessible via an interactive software program, whereby said user may interactively add additional geographic locations to said list of registered geographic locations.

10. A method of accessing a network resource from a remotely-located computer, comprising the steps of:
   a) receiving credential information at said computer and sending said credential information to an authentication system;
   b) the authentication system initiating a telephone call to a user of said remotely-located computer;
   c) obtaining a voiceprint of said user during said telephone call;
   d) obtaining current location information of said user from said telephone call;
   e) receiving a profile database for a plurality of users including said user;
   f) generating an authorization signal indicating that the user is authorized to access the network resource if 1) the credential information from the user matches credential information for the user in the profile database; 2) the voiceprint of the user matches a voiceprint sample of a person authorized to access said network resource, and 3) the location of the user determined in step d) matches a list of one or more registered permissible locations for the resource and/or the user;
   g) sending the authorization signal to the network resource indicating that the user is authorized to access the network resource.

11. The method of claim 10, wherein said telephone call comprises a cellular telephone call and the location information is obtained from a cellular location determination server.

12. The method of claim 11, wherein the location information is obtained from GPS data sent from the cellular telephone of said user to the authentication system.

13. An authentication system for authenticating a user seeking to access a network resource, comprising:
   a network interface receiving data from a network, said data containing credential information from the user, a voice print of the user, telephone call information for the user, and a list of one or more registered permissible geographic locations at which the user may be present to access the network resource;
   at least one central processing unit;
   a user profile database;
   machine-readable memory storing a set of instruction for execution by said at least one central processing unit,
   said instructions including instructions for transmitting said telephone call information to a call location server to determine the geographic location of the user;
   said instructions further including instructions comparing the credential information supplied by the user to with credential information obtained from the user profile database;
   instructions comparing the voice print of the user with a voiceprint sample; and
   instructions for sending an authorization signal indicating that the user is authorized to access the network resource if 1) the credential information from the person matches credential information in a user profile database in said authentication system; 2) the voiceprint of the user matches a voice print sample of a person authorized to access said resource, and 3) the user is located at one or more registered permissible geographic locations for the user.

14. The authentication system of claim 13, wherein the telephone call information comprises a telephone number.

15. The authentication system of claim 13, wherein the call information comprises information from a cellular telephone call to said authentication system and wherein said call location server determines the geographic location of the cellular telephone of the user.

16. The authentication system of claim 13, wherein said network resource comprises a file on a network server.

17. The authentication system of claim 13, wherein said network resource comprises a web page.

18. The authentication system of claim 13, wherein said network resource comprises a computer network.

19. The authentication system of claim 13, wherein said authentication system further comprises an interactive voice response system and a voice print identification module.

20. The method of claim 1, wherein initiating voice communication between the user and an authentication system for the network resource and obtaining a voice print of the user comprises:

invoking an interactive voice response (IVR) system to place a telephone call to a cellular telephone of the user; and the IVR system receiving a voice print from the user.

21. The method of claim 1, further comprising determining if the user is in a permissible location to be authenticated for access to the resource.

* * * * *